Nov. 17, 1970 AISUKE KATAYAMA 3,541,455

TUNING SYSTEM BY VARIABLE INDUCTANCE

Original Filed Jan. 3, 1966 5 Sheets-Sheet 1

Nov. 17, 1970 AISUKE KATAYAMA 3,541,455

TUNING SYSTEM BY VARIABLE INDUCTANCE

Original Filed Jan. 3, 1966 5 Sheets-Sheet 3

United States Patent Office 3,541,455

Patented Nov. 17, 1970

3,541,455

TUNING SYSTEM BY VARIABLE INDUCTANCE

Aisuke Katayama, 6–14 Kawajiri Ueno-cho, Akita-shi, Akita-ken, Japan

Continuation of application Ser. No. 518,235, Jan. 3, 1966. This application May 20, 1969, Ser. No. 827,123
Claims priority, application Japan, Jan. 14, 1965, 40/1,613
Int. Cl. H03j 3/20
U.S. Cl. 325—468 3 Claims

ABSTRACT OF THE DISCLOSURE

A current-controlled variable inductance tuning system comprises at least one tuning core provided with a high frequency coil and a direct current coil and at least one choke core provided with a direct current coil. A capacitor is connected in parallel with the high frequency coil to form a resonant circuit and the circuit is tuned to different resonant frequencies by varying the amplitude of the current flowing through the direct current coils on the two cores connected in series. The magnetization curves of the two cores are made different from one another so that the variation of the effective inductance of the high frequency coil is substantially inversely proportional to the square of the direct current thus assuring a variable resonant frequency which is linear throughout a wide range.

This invention relates to tuning systems wherein is used one or more variable inductances which can be varied by controlling an electric current.

There has been already often used a tuning system for communication systems wherein tuning is obtained by varying a resonance frequency within a required range by varying the values of L and C of a resonance circuit by a mechanical means. Due to the recent progress of semiconductors, variable capacitance diodes in which the electrostatic capacitance is varied with an impressed voltage have come to be utilized. However, due to the losses of the variable capacitance diodes themselves and coils, it is difficult to elevate the Q of the resonance circuit.

A tuning system wherein the value of an inductance is electrically varied has been also suggested against a tuning system wherein the value of a condenser is electrically varied. There has been suggested an apparatus wherein direct current magnetization is applied by inserting a high frequency ferrite, for example, of a toroidal form, in a U-shaped yoke to which is applied a controlling current. However, such apparatus using single magnetization has defects in that the curvature of the curve of the tuning frequency to the controlling current is so large that it is difficult to let the tracking error between the local oscillation frequency and frequency of the tuning stage be small. The present invention has been suggested to eliminate the above mentioned defects.

A principal object of the present invention is to provide a tuning system wherein is utilized variable inductance by ferrite which provide good linearity between the tuning frequency and the controlling current and between the local oscillation frequency and the controlling current in the required band. And thus the tuner with minimum tracking error can be constructed.

A further object of the present invention is to provide a tuning system wherein is utilized variable inductance operated in the domain where the influence of hysteresis is minimized. And further the required level of Q is held almost constant in the used frequency band.

Another object of the present invention is to provide a tuning system which is vibration proof and small, is high in sensitivity and has little tracking error.

Still another object of the present invention is to provide a tuning system wherein the difficulties in the mechanism of the conventional tuner are eliminated by selecting the resonance frequencies with switching positions of resistors located in the lower level side of a controlling transistor.

Said objects, other objects and characteristic features of the present invention will become evident and will be more readily understood by reading the following description and claims taken in conjunction with the accompanying drawings in which:

Figure 1:
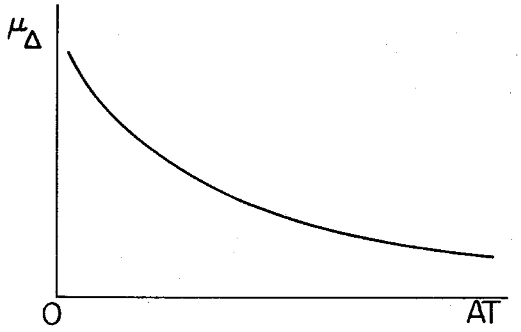
FIG. 1 shows the variation of the magnetic permeability $\mu_\Delta$ with the ampere turns AT of a core.

The present invention makes use of the phenomenon that, when an electric current is applied in one direction to a coil wound on a ferrite core to magnetize the core in one direction and the current is applied again in the same direction, a curve representing the characteristics of the incremental magnetic permeability $\mu_\Delta$ of the ferrite to the ampere turn AT of the coil will always have a stable characteristic as shown in FIG. 1. This characteristic is present in a tuning system wherein the direct current coil of a tuning core and the coil of a choke core are connected in series on the current controlling side. The tuning core and choke core are magnetized simultaneously in the same direction and if their magnetizing curves are made different so that the variation of the effective inductance of a high frequency coil provided on said tuning core is substantially inversely proportional to the square of the controlling current, the resonance frequency can be made linearly variable in a wide range dependent upon the controlling current and the influence of the hysteresis and the fluctuation of Q may be minimized. In FIG. 1, $\mu_\Delta$ is taken on the ordinate and the ampere turn is taken on the abscissa.

Figure 2:
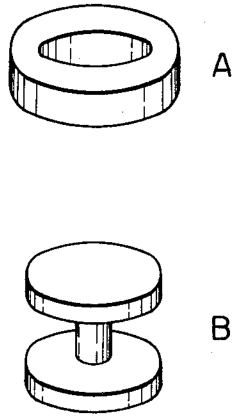
FIG. 2 illustrates two forms of cores.

FIG. 2 illustrates two forms of cores. A shows a toroidal core and B shows a drum-shaped core. In the present invention, it is possible to use both cores.

Figure 3:
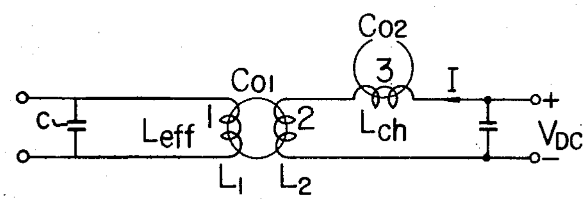
FIG. 3 shows a basic circuit diagram of the present invention.

FIG. 3 shows a basic circuit of a tuning system according to the present invention. In FIG. 3, $Co_1$ is a tuning core and $Co_2$ is a choke core. Both of them are cores operating in the falling part of the curve of incremental magnetic permeability $\mu_\Delta$-ampere turn AT characteristics. For example, there are used a toroidal core for the form of the tuning core $Co_1$ and a toroidal core or drum-shaped core for the form of the choke core $Co_2$. 1 is a high frequency coil wound on the tuning core $Co_1$. 2 is a direct current coil wound on the same core. 3 is a choke coil wound on the choke core $Co_2$. $V_{DC}$ is a direct current source. The direct current coil 2 and the choke coil 3 are connected in series to the direct current source $V_{DC}$. $L_{eff}$ represents the variable effective inductance of the high frequency coil 1.

Now, the inductances of the high frequency coil 1, direct current coil 2 and choke coil 3 shall be $L_1$, $L_2$ and $L_{ch}$, respectively. However, $L_1$, $L_2$ and $L_{ch}$ shall represent the inductances when only the respective coils are each wound in a magnetizing state in the working range. When the mutual inductance between the coils 1 and 2 is M and the coupling coefficient is K, the following equation will be established $$M=K\sqrt{L_1L_2} \qquad (1)$$

If the effective impedance of the high frequency coil 1 is $Z_1$ in the basic circuit diagram according to the present invention in FIG. 3, $Z_1$ can be represented by the following equation $$Z_1=j\omega L_1(I)+\frac{\omega^2 M(I)^2}{j\omega\{L_2(I)+L_{ch}(I)\}} \qquad (2)$$

wherein $\omega$ is an angular frequency. From the Equations (1) and (2), $Z_1$ will be $$Z_1=j\omega L_1(I)-j\omega K^2\frac{L_1(I)L_2(I)}{L_2(I)+L_{ch}(I)} \qquad (3)$$

Now, if the coils 1 and 2 are closely coupled, $K\simeq 1$ and therefore the equation (3) will be $$Z_1=j\omega L_1(I)-j\omega\frac{L_1(I)\cdot L_2(I)}{L_1(I)+L_{ch}(I)}$$

$$=j\omega L_1(I)\left\{1-\frac{L_2(I)}{L_2(I)'+L_{ch}(I)}\right\}$$

Therefore, the effective inductance $L_{eff}$ of the high frequency coil 1 will be $$L_{eff}=L_1(I)\left\{1-\frac{L_2(I)}{L_2(I)+L_{ch}(I)}\right\} \qquad (4)$$

When the coils 1 and 2 are bifilarly wound, $L_1(I)=L_2(I)$. Therefore, $$L_{eff}(I)=\frac{L_1(I)L_{ch}(I)}{L_1(I)+L_{ch}(I)} \qquad (5)$$

Thus the high frequency effective inductance $L_{eff}$ will be equivalent to the parallel connection of $L_1$ and $L_{ch}$.

When a fixed condenser C is connected in to parallel to the high frequency coil 1 of the tuning core $Co_1$ so as to form a resonant circuit, when the controlling current is I the tuning frequency $f$ will be given by the equation $$f(I)=\frac{1}{2\pi\sqrt{CL_{eff}(I)}} \qquad (6)$$

In the falling part of the magnetization characteristics, after the cores are once magnetized, when $I\simeq 0$, the incremental magnetic permeability $\mu_\Delta$ will take the maximum value. Therefore, when $I\simeq 0$, the $L_{eff}$ will become maximum and the minimum value $f_{min.}$ of the tuning frequency will be determined by the equation $$f_{min}=\frac{1}{2\pi\sqrt{CL_{eff}(O)}} \qquad (7)$$

Figure 4:
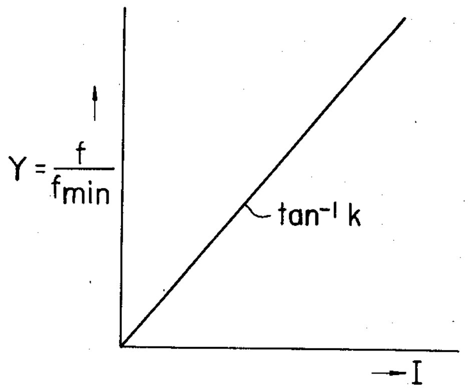
FIG. 4 shows a relation between an ideal tuning frequency and a controlling current.

Let $f/f_{min.}=y$, as shown in FIG. 4, $$y-1=KI \qquad (8)$$

Therefore, the tuning frequency will linearly vary with the controlling current I. In FIG. 4, $y$ is taken on the ordinate and the controlling current I is taken on the abscissa. In case a tuning circuit is to be used as a tuner for a receiver or the like, some tuning circuits will be ganged and therefore the linearity of the tuning frequency with the controlled amount will be a most important factor. In the present invention, the tuning core $Co_1$ and choke core $Co_2$ are set respectively in a different magnetizing state, the variation of $L_{eff}(I)/L_{eff}(O)$ is kept linear with the controlled amount of the tuning frequency and the controlled sides of the tuning core $Co_1$ and choke core $Co_2$ are connected in series to the controlling direct current source. From the equations (5), (6), (7) and (8), the following relative equation will be obtained on the ratio of the reciprocal of $L_{eff}$ (I) to the reciprocal of $L_{eff}$(O):

$$\{L_{eff}(I)\}^{-1}/\{L_{eff}(O)\}^{-1}=(KI+I)^2=K^2I^2+2KI+I^2 \qquad (9)$$

Figure 5:
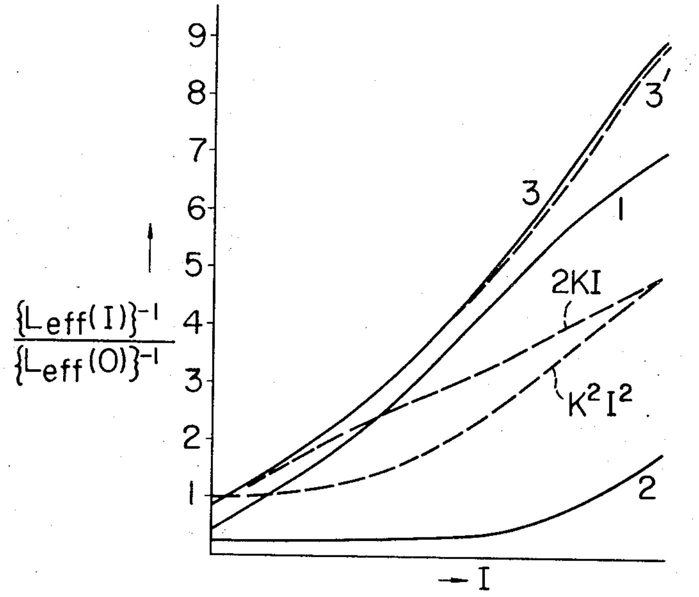
FIG. 5 shows variations of reciprocals of the inductances of a coil wound on a tuning core and a coil wound on a choke core with a controlling current so that the tuning frequency may linearly vary with the controlling current.

In FIG. 5, $$\{L_{eff}(I)\}^{-1}/\{L_{eff}(O)\}^{-1}$$

is taken on the ordinate and the controlling current I is taken on the abscissa. The curve 3 shows the variation of $$\{L_{eff}(I)\}^{-1}/\{L_{eff}(O)\}^{-1}$$

satisfying the equation (9).

If $$\{L_{eff}(I)\}^{-1}/\{L_{eff}(O)\}^{-1}$$

is varied with the controlling current I as in the curve 3, the tuning frequency will linearly vary with the controlling current.

On the other hand, in case the coils 1 and 2 of the tuning core $Co_1$ are bifilarly wound, from the equation (5)

$$\{L_{eff}(I)\}^{-1}=\{L_1(I)\}^{-1}+\{L_{ch}(I)\}^{-1}$$

Therefore, if the sum of the variations of $$\{L_1(I)\}^{-1}/\{L_{eff}(O)\}^{-1} \text{ and } \{L_{ch}(I)\}^{-1}/\{L_{eff}(O)\}^{-1}$$

with the controlling current I is so made as to be represented by the curve 3, the tuning frequency with the controlling current can be made linear. Now, if a closed magnetic circuit type core as, for example, a toroidal core is used for the tuning core and the magnetizing state is varied from the part in which the controlling current I is small, the variation of the increased magnetic permeability $\mu_\Delta$ will be large at first but will become smaller as saturation is approached when the controlling current I becomes larger. As $$\{L_1(I)\}^{-1}/\{L_{eff}(O)\}^{-1}$$

generally varies with the curve 1 in FIG. 5, it will not be parallel with the curve 3. Therefore, in a combination of the coil 2 of the tuning core $Co_1$ and a choke coil of a fixed value, no linearity of the tuning frequency will be obtained.

On the other hand, the magnetizing state of the choke core $Co_2$ can be varied as in the curve 2 in FIG. 5 by using an open magnetic circuit type core having a small gap as, for example, a drum-shaped core with wide flanges so that the incremental magnetic permeability $\mu_\Delta$ may vary greatly in the part in which the controlling current I is large.

The above mentioned difference between the respective magnetizing states of the tuning core and choke core is caused substantially by the difference between the respective magnetic lengths of these cores. That is, the magnetic length of the choke core is longer than that of the tuning core, because of the gap in the drum-shaped core utilized for the choke core according to the present invention, where the permeability is 1.

As in the above, if $\{L_1(I)\}^{-1}$ and $\{L_{ch}(I)\}^{-1}$ are varied with the same controlling current, from the Equation 5, the sum of the curves 1 and 2 can be brought closer to the ideal variation curve 3 of $$\{L_{eff}(I)\}^{-1}/\{L_{eff}(O)\}^{-1}$$

Thus it has been confirmed that, in the basic cricuit of the present invention, when the direct current coil 2 and choke coil 3 of the tuning core $Co_1$ and choke core $Co_2$ operating in the falling part of the $\mu_\Delta$–AT curve are connected in series and the form material and winding of the core are properly selected so that the variation of the $L_{eff}$ of the high frequency coil 1 of the tuning core $Co_1$ may be inversely proportional to the controlling current $I_2$, the linear current control in a wide range of the resonance frequency $f$ can be realized and, after the current is applied so that the magnetic wall may move sufficiently once at the time of the use, the stability of the falling part of the $\mu_\Delta$–AT curve with the current variation in the same direction will be so sufficient that the hysteresis will be small and the fluctuation of Q in the used frequency range can be minimized.

The effective $Q_{eff}$ of the basic circuit according to the present invention with $Q_1$ in the case of only the coil of the tuning core is given by the following relative equation $$Q_{eff} \simeq Q_1 \frac{L_{ch}(I)/(L_1(I)+L_{ch}(I))}{1+^{r_c}\left(\frac{L_1(I)}{L_1(I)+L_{ch}(I)}\right)^2} \qquad (10)$$

wherein $r_1$ is a loss resistance of the coil of the tuning core and $r_c$ is a loss resistance of the choke coil 3 and includes the loss of the core. As all the amounts of $L_{ch}$, $L_1$, $L_1+L_{ch}$, $r_1$ and $r_c$ related with the frequency are in the form of ratios in the second term on the right side of the Equation 10, when $Q_1$ is kept substantially constant in any required band, $Q_{eff}$ will be also kept substantially constant.

Figure 6:
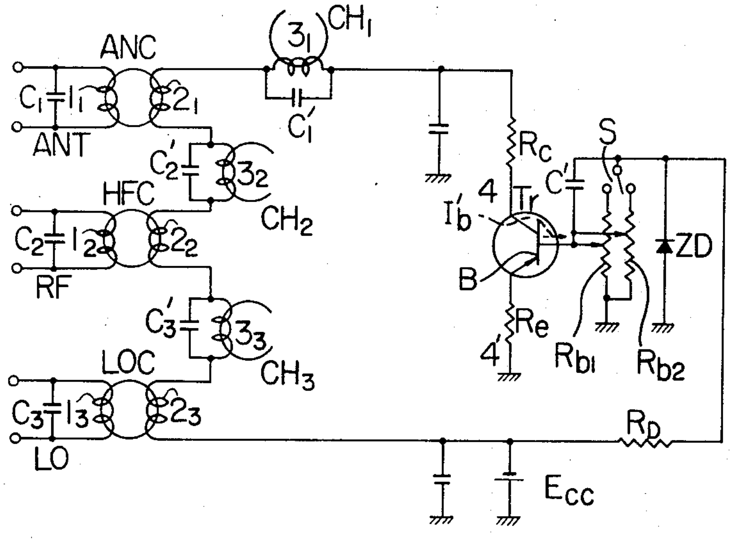
FIG. 6 shows a basic circuit as of a tuning system.

In the present invention, a variable inductance tuning system by current control is realized by using the above described basic circuit. FIG. 6 is a basic circuit diagram showing an embodiment of the present invention. In FIG. 6, T$r$ is a current amplifying element such as a transistor for controlling and tuning currents. The current value on the output side 4–4′ is set by the small current value on the input side. On the output side 4–4′ of the current amplifying element T$r$, direct current coils $\mathbf{2}_1$, $\mathbf{2}_2$ and $\mathbf{2}_3$ wound respectively on a ferrite core ANC for an antenna circuit, a ferrite core HFC for a high frequency circuit and a ferrite core LOC for a local oscillation circuit and choke coils $\mathbf{3}_1$, $\mathbf{3}_2$ and $\mathbf{3}_3$ wound respectively on ferrite choke cores $CH_1$, $CH_2$ and $CH_3$ are connected in series. The direct current source E$cc$ is connected on the minus side to the base of the transistor T$r$ through a limiting resistance $R_D$ and a condenser C′. Each of the resistances $R_{b1}$ and $R_{b2}$ is earthed at one end and is connected at the other end of the limiting resistance $R_D$ through a switch S. The sliders of the resistances $R_{b1}$ and $R_{b2}$ are connected to the base of the transistor T$r$. $R_c$ and $R_e$ are resistances and ZD is a Zener diode.

Figure 8:
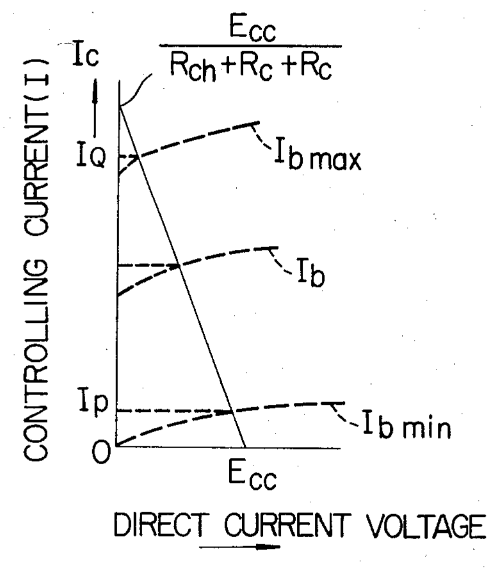
FIG. 8 shows operation characteristics of a controlling transistor.

As the effective inductances $L_{eff}$ on the high frequency sides of the antenna coil 1, high frequency coil $\mathbf{1}_2$ and local oscillation coil $\mathbf{1}_3$ vary simultaneously in the same direction with the variation of the controlling direct current, if fixed condensers $C_1$, $C_2$ and $C_3$ are connected in parallel with said coils $\mathbf{1}_1$, $\mathbf{1}_2$ and $\mathbf{1}_3$, respectively, and the tuning frequencies are set, the tuning frequencies of the antenna circuit and high frequency circuit will vary simultaneously in the same direction in response to the variation of the controlling current I and the local oscillation frequency can be varied simultaneously at the same rate in the same direction with an intermediate frequency difference. As shown in FIG. 8 showing the controlling current I on the ordinate and the voltage of the direct current source on the abscissa, in the case of controlling the current, for example, between $I_P$ and $I_Q$, the station selecting operation on the input side of the transistor T$r$ can be made by selecting a minute input current $I_b$ for the direct current voltage $E_{cc}$ and making the resistance $R_b$ variable. For example, in the case of selecting a station with a manual push button, the station selecting operation can be made by switching the resistance $R_b$ with the switch S. In the manual push button station selection in FIG. 6, in the case of switching from the resistance $R_{b1}$ to the resistance $R_{b2}$ with the switch S, the switch S will be once opened and therefore, before the resistance $R_{b2}$ is switched, the condenser C′ will be charged up to the direct current voltage $E_{cc}$. In this process, a transient current $I_b'$ flows to the base B of the transistor T$r$, a large collector controlling current is made to flow to the series tuner exciting circuit connected to the collector side and a maximum current in the used current direction is made to flow so sufficiently as to magnetize the ferrite cores to nearly saturation region. After this, the next resistance $R_{b2}$ will be switched with the switch S. Therefore, no deviation of the frequency by the hysteresis will be produced, because all magnetizing points of the cores follow on the $\mu_\Delta$–AT curve of FIG. 1.

The present invention is characterized by the fact that the linear variation in a wide range of tuning and local oscillation frequencies is made possible and tracking can be made easy by connecting in series the choke coils $\mathbf{3}_1$, $\mathbf{3}_2$ and $\mathbf{3}_3$ in the direct current controlling parts of the antenna circuit, high frequency circuit and local oscillation circuit in the above described basic circuit. As described above, the required level of effective Q is held almost constant in the used frequency band. Further, the choke coils $\mathbf{3}_1$, $\mathbf{3}_2$ and $\mathbf{3}_3$ are effective to eliminate the interference of the antenna circuit, high frequency circuit and local oscillation circuit with one another. The condensers $C_1'$, $C_2'$ and $C_3'$ inserted in the choke coils $\mathbf{3}_1$, $\mathbf{3}_2$ and $\mathbf{3}_3$ are to eliminate any unnecessary connection among the circuits.

Figure 7:
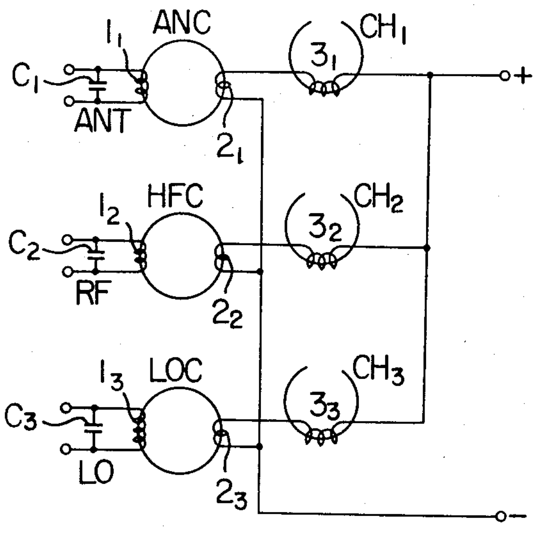
FIG. 7 shows another example of a circuit comprising coils wound on tuning cores and coils wound on choke cores.

FIG. 6 shows a formation of basic circuits by series connection. Even if the basic circuits are connected in series or parallel (see FIG. 7) on the output sides of the current amplifying elements T$r$, a variable inductance tuning system of a current controlled type can be also realized.

EXAMPLE

Figure 9:
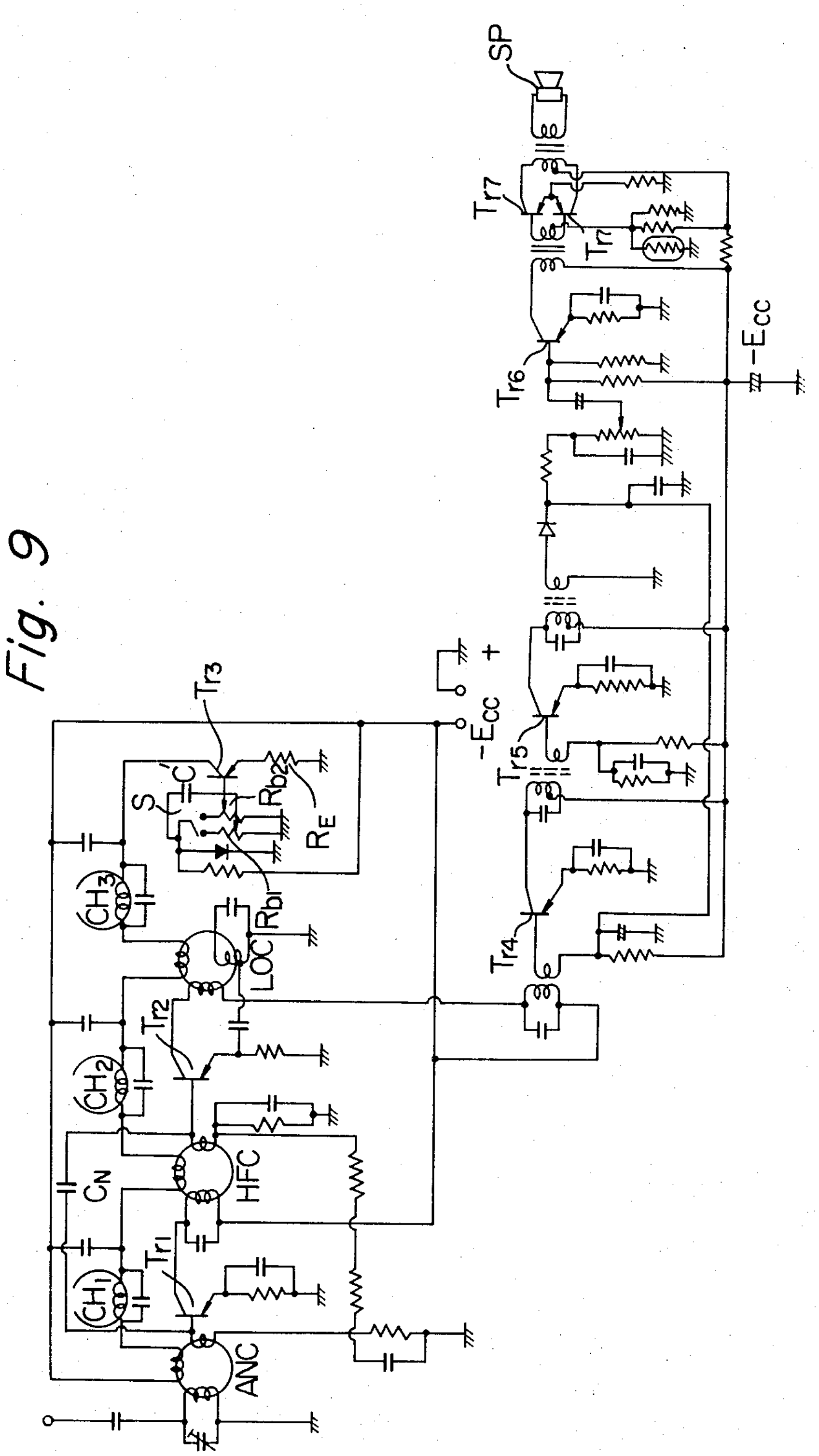
FIG. 9 shows an example of a tuning system in a high frequency amplifier stage according to the present invention.

A car radio for BC bands with a wide range variable inductance tuning system of a current controlled type was experimentally made. Its circuit diagram is as in FIG. 9. In FIG. 9, ANC, HFC and LOC are cores for an antenna circuit, high frequency circuit and local oscillation circuit, respectively. $CH_1$, $CH_2$ and $CH_3$ are choke cores respectively corresponding to them. $Tr_1$, $Tr_2$ and $Tr_3$ are transistors for amplifying high frequencies, mixing local oscillations and controlling currents, respectively. $C_N$ is a neutralizing condenser inserted to cancel any slight connection by the transistor $Tr_1$ and choke coil $CH_2$. The station selecting operation is made by switching the resistance with the switch S on the base side of the transistor $Tr_3$.

Figure 10:
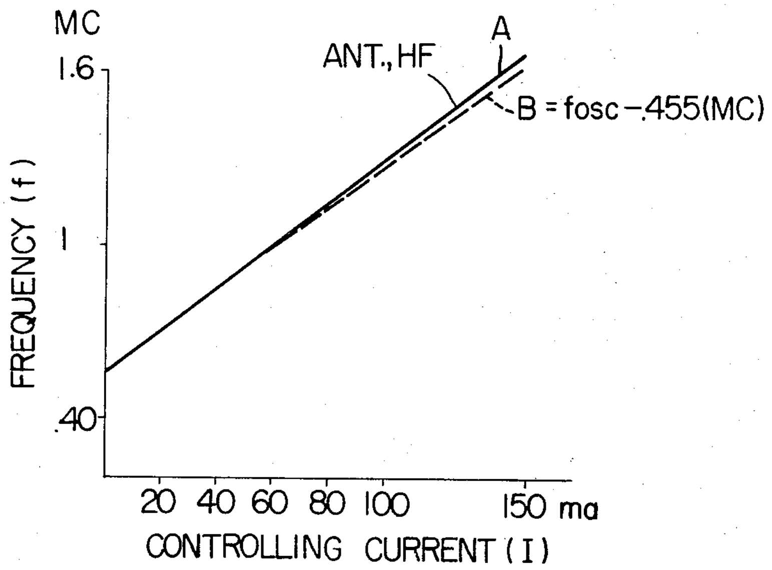
FIG. 10 shows tracking characteristics in the above example.

FIG. 10 shows the tracking characteristics of the above mentioned circuit. The frequency $f$ is taken on the ordinate and the controlling current I is taken on the abscissa. The curves A and B represent the variations of the tuning and local oscillation frequencies with the controlling current I, respectively. As evident from said FIG. 10, the tracking error is kept below a maximum of 5 kc. and the linearity is good. The condenser C′ is inserted to prevent the production of the hysteresis.

As in the above, the system of the present invention, the linear current control in a wide range of resonance frequencies can be made, the hysteresis and the fluctuation of Q can be minimized and the mechanical strength is higher and the realization of making the apparatus smaller and of the automatic selection of stations is easier than in any variable inductance apparatus in which a conventional mechanical tuning system is used.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

I claim:

1. A current-controlled type variable inductance tuning system comprising a plurality of basic tuning circuits, each said basic circuit including a toroidal tuning core and a drum-shaped choke core, a high frequency coil and a direct current coil wound on the tuning core, a choke coil wound on the choke core and connected in series with said direct current coil, and a capacitor connected in parallel with the high frequency coil to form a resonant circuit therewith, the tuning and choke cores of each basic circuit being separate and distinct from the tuning and choke cores of all other such basic circuits, said tuning and choke cores of each basic circuit being capable of being operated in a different magnetized state from each other respectively for the same control current owing to their different lengths, turns and remanence characteristics of the materials from which said cores are made, so that in a small control current region the tuning core magnetization proceeds first and the incremental permeability is decreased inversely and proportional to the square of the control current while that of the choke core is kept essentially constant due to its longer magnetic length, and in a medium or high current region the tuning core approaches magnetic saturation and the choke core proceeds to magnetize promptly to thus decrease the incremental permeability of the choke core while that of the tuning core remains at a constant lower value, the effective inductance of the high frequency coil of each said basic circuit varying substantially in an inverse proportion to the square of the control current fed through the series connection of the direct current coil and choke coil of such basic circuit thereby enabling a wide linear tuning frequency range to be obtained by varying the control current, amplification means for providing said control current in response to a variable input signal applied to said amplification means, and circuit means connecting the series connected direct current coil and choke coil of each said basic circuit to the output of said amplification means thereby to enable a tuning frequency to be selected from a tuning frequency range by selecting the value of said input signal.

2. A system as defined in claim 1 in which the direct current coil and the choke coil of each basic circuit is connected in series with the direct current coil and choke coil of all other such basic circuits to form a series chain with the amplification means.

3. A system as claimed in claim 1 in which the direct current coil and choke coil of each basic circuit are connected in series, and each basic circuit is connected as a chain of parallel circuits, and said chain of parallel circuits is connected in series to the amplification means.

References Cited

UNITED STATES PATENTS 2,997,584 8/1961 Querfurth ------------ 334—12

ROBERT L. GRIFFIN, Primary Examiner

J. A. BRODSKY, Assistant Examiner

U.S. Cl. X.R.

334—12, 71